Figure 1:
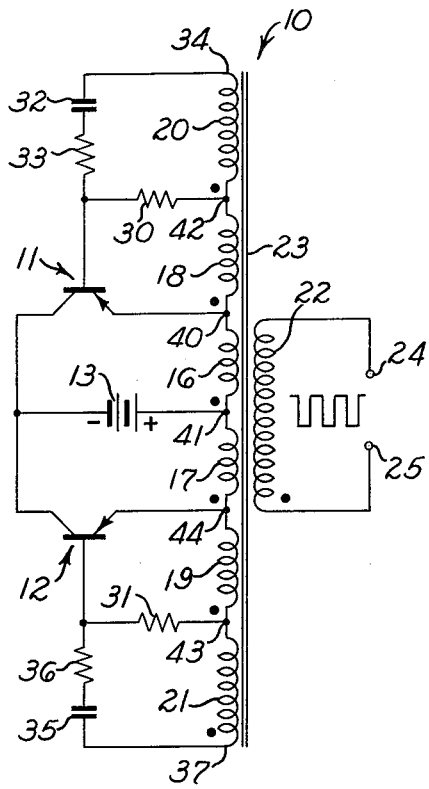

Aug. 28, 1962     J H. BROWN     3,051,914

D.C. TO A.C. CONVERTER

Filed Nov. 6, 1958

INVENTOR.

J HERBERT BROWN

BY HIS ATTORNEYS.

HARRIS, KIECH, FOSTER & HARRIS

United States Patent Office 3,051,914
Patented Aug. 28, 1962

3,051,914
D.C. TO A.C. CONVERTER
J Herbert Brown, La Habra Heights, Calif., assignor to Beckman Instruments, Inc., a corporation of California
Filed Nov. 6, 1958, Ser. No. 772,373
9 Claims. (Cl. 331—113)

This invention relates to D.C. to A.C. converters or oscillators which produce a square wave output and, in particular, to converters wherein the product of volts and seconds per half cycle is constant and independent of the magnitude of the D.C. input voltage.

Converters of this general type have been in use for some time and a typical one is described in an article by G. H. Royer appearing in "Communications and Electronics," July 1955, pages 322, 326, a publication of the American Institute of Electrical Engineers. The converter includes two transistors and a saturable core transformer with the transistors connected to windings on the transformer and alternately conducting to switch the core between opposite flux saturation conditions. An output winding on the core produces an output voltage which alternates between two levels providing the desired square wave output. There are transition stages as the output voltage changes from one level to the other, which transition stages are due to the time involved in switching in the converter circuitry. The duration of the transition stages provides a measure of the quality of the converter, a shorter transition stage providing a more square output, which is usually desirable.

It has been found that the inadequacy of the known circuits for those applications where a square output waveform is necessary at relatively high frequency, is essentially due to the effect commonly known as minority carrier storage. Minority carrier storage in the prior D.C. to A.C. converters requires the external conditions, or prerequisites, for changing the conducting status of a transistor to the nonconducting state, or vice versa, to persist for some time before the change of status actually takes place.

For many applications, the transition periods between the high and low voltage levels in the output of a D.C. to A.C. converter must be extremely short so that the output is substantially square. Furthermore, this square wave output must be obtained while the converter is operating at frequencies as high as several thousand cycles per second. A short transition period is also desirable because the transistors work more nearly like ideal switches with reduced heating. Virtually they are now either infinite impedances or zero impedances, in both cases no energy being dissipated.

For example, the converter of the invention may be used as a power supply for magnetic amplifiers such as the amplifiers described in my copending application entitled "Magnetic Core Amplifying Circuit," Serial No. 743,787, filed June 23, 1958 and assigned to the same assignee as the present application. In the converters of the invention, the volt-seconds per half cycle is constant because the saturable core of the transformer requires a constant number of volt-seconds to be changed from one flux saturation state to the other. Hence, the D.C. to A.C. converter will supply A.C. power having constant volt-seconds per half cycle even though the D.C. input voltage is not constant. It is a characteristic of this type of D.C. to A.C. converter that the frequency of the A.C. output changes as a function of the D.C. input but that the volt-seconds per half cycle remains constant.

It is an object of the invention to provide a D.C. to A.C. converter which will generate a square wave output in which the transition stage from one voltage level to the other comprises a very small portion of the total cycle. A further object is to provide such a converter which will supply the substantially square wave output at frequencies in the order of several thousand cycles per second.

It is an object of the invention to provide a D.C. to A.C. converter operating in the conventional manner with a saturable core transformer and a pair of switching transistors and having, in addition, first and second charge storage means connected to the bases of the respective transistors and means for charging each of the charge storage means while the corresponding transistor is conducting and the flux in the core is changing with the charge on each charge storage means being of a polarity to cut off conduction in the conducting transistor and increase conduction in the other transistor. A further object of the invention is to provide a converter in which each of the charging means includes a charging winding on the core and connected across the corresponding charge storage means so that flux change in the core provides a charge on the storage means. Another object of the invention is to provide such a converter in which the charge storage means comprises a resistance-capacitance circuit connected to the base of the corresponding transistor so that discharge of the capacitor through the resistance will change the polarity of the bias on the transistor.

Other objects, advantages, features and results of the invention will more fully appear in the course of the following description. The drawing merely shows and the description merely describes preferred embodiments of the present invention which are given by way of illustration or example.

Figure 2:
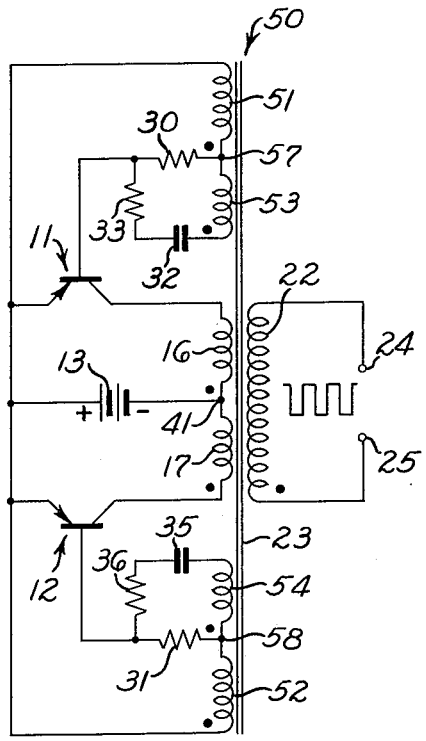

In the drawing:
FIG. 1 is a schematic diagram of a preferred form of D.C. to A.C. converter; and
FIG. 2 is a schematic diagram of an alternative form of D. C. to A.C. converter.

The D.C. to A.C. converter of FIG. 1 includes a saturable core transformer 10, transistors 11, 12, and a D.C. power source such as a battery 13. The transformer has input windings 16, 17, bias windings 18, 19, charging windings 20, 21, and an output winding 22 on a core 23. The core is formed of a saturable magnetic material, preferably material having a substantially square hysteresis loop. The windings 16–21 are preferably connected in series as shown in the circuit of the drawing and are wound to have the same polarities as indicated by the black dots at the lower end of each winding. Output terminals 24, 25 are connected to the ends of the output winding 22.

PNP type transistors are used in the circuit of FIG. 1 with the positive terminal of the battery 13 connected to the junction 41 of the winding 16, 17 and the negative terminal of the battery connected to the collectors of each of the transistors 11, 12, the emitters of the transistors being connected to the other end of the windings 16, 17 respectively. Of course, npn type transistors can be used by suitably arranging the polarities of the circuit.

A resistor 30 is connected between the junction 42 of the windings 18, 20 and the base of the transistor 11 and a corresponding resistor 31 is connected between the junction 43 of the windings 19, 21 and the base of the transistor 12. A capacitor 32 and a resistor 33 are connected in series across the base of the transistor 11 and the free end 34 of the winding 20 while a corresponding capacitor 35 and resistor 36 are connected in series across the base of the transistor 12 and the free end 37 of the winding 21.

In the operation of the circuit as a square wave oscillator or converter, the capacitors 32 and 35 serve as charge storage means which are charged through the resistors 30, 33 and 31, 36 by the charging windings 20, 21, respectively, when one or the other of the transistors is conducting. During the transition stages between the conduction portions of the cycle of operation, the capacitors discharge through their associated resistors to provide bias voltages for the corresponding transistor bases to accelerate the change from conduction to nonconduction and from nonconduction to conduction and thereby shorten the transition stage.

Suppose now that the transistor 11 is conducting. There will be a small voltage drop across the collector and emitter with the major portion of the battery voltage applied to the winding 16. The current in the winding 16 will produce a flux change in the core 23 and induce voltages of the same sense in each of the remaining windings on the core until further flux change in the core is prevented by saturation of the core.

Under these conditions, junction 40 of the windings 16, 18 is negative with respect to junction 41 of the windings 16, 17 and junction 42 of the windings 18, 20 is negative with respect to the junction 40. The junction 42 is connected to the base of the transistor 11 through the resistor 30 providing a negative bias on the transistor and maintaining it in conduction. At the same time, junction 43 between the windings 19 and 21 is positive with respect to junction 44 between the windings 17 and 19, providing a positive bias on the base of the transistor 12 maintaining the transistor in the cutoff or nonconduction condition. Also, the capacitor 32 is charged from the winding 20 and the capacitor 35 is charged from the winding 21.

This condition persists for the time required for the core to change from one flux saturation state to the other saturation state and provides the horizontal portion of one half cycle of the output.

However, when the core 23 becomes saturated due to continued application of the current in the winding 16, magnetic coupling between the windings substantially ceases and there will be practically no voltages induced across the windings 18, 19, 20, 21. The collapse of the voltage generated by the bias winding 18 removes the conduction bias from the transistor 11. Furthermore, the collapse of the voltage of the charging winding 20 permits the capacitor 32 to discharge through the resistors 33, 30 which function as a voltage divider to provide a positive or cutoff bias for the base of the transistor 11. The charge of the capacitor 32 causes relatively large current to flow towards the base of the transistor 11, thereby quickly counteracting any hole storage effect. At the same time, the capacitor 35 is discharging through the resistors 36, 31 providing a negative or conduction bias for the base of the transistor 12 and counteracting minority carrier effects. Hence, the transistor 11 is very quickly driven to cut off and the transistor 12 is very quickly driven to full conduction, resulting in current in the winding 17 and a flux change in the core 23 from the prior saturation state toward the opposite saturation state. Now the situation is reversed and the transistor 12 remains in conduction until the opposite saturation state is reached by the core. At that time, a similar transition occurs, thus completing a cycle of oscillation of the converter.

The charge storage means associated with each transistor base and comprising the capacitor and corresponding resistances, which storage means is charged from the charging winding during the flat portions of the output cycle, provides substantially instantaneous transition by producing immediate changes in the bias polarities on each of the transistors. The transition time will be a function of the turns ratio of windings 20 and 16 and windings 21 and 17. This ratio is preferably greater than one and preferably in the order of five to one.

The circuit of FIG. 2 is similar to that of FIG. 1 and the same components are identified by the same reference numerals. The converter includes a saturable core transformer 50, transistors 11, 12 and a D.C. power source 13. The transformer has input windings 16, 17, bias windings 51, 52, charging windings 53, 54, and an output winding 22 on the core 23. The windings 16, 17, 51–54 are wound to have the same polarities as indicated by the conventional black dots at the lower end of each winding. The emitter and collector electrodes of the transistor 11 are connected in series with the winding 16 across the battery 13 and the emitter and collector electrodes of the transistor 12 are connected in series with the winding 17 across the battery 13.

The resistor 30 is connected between the junction 57 of the windings 51, 53 and the base of the transistor 11 and the corresponding resistor 31 is connected between the junction 58 of the windings 52, 54 and the base of the transistor 12. The capacitor 32 and the resistor 33 are connected in series across the base of the transistor 11 and the free end of the winding 53 while a corresponding capacitor 35 and resistor 36 are connected in series across the base of the transistor 12 and the free end of the winding 54.

The circuit of FIG. 2 operates in the same manner as the circuit of FIG. 1. When the transistor 11 is conducting the base is kept negative by the voltage induced in the winding 51 and the base of the transistor 12 is kept positive by the voltage induced in the winding 52, thereby tending to maintain the transistor 11 in a conducting condition and the transistor 12 in a nonconducting condition. During this period the capacitors 32, 35 are charged from the windings 53, 54, respectively. Then when the core becomes saturated and the induced voltages in the windings collapses, the charge on the capacitor 32 quickly shifts the transistor 11 to the nonconductive condition and the charge on the capacitor 35 shifts the transistor 12 to the conducting condition in the same manner and in the same extremely short time as the circuit of FIG. 1.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In a square wave oscillator having first and second transistors, a saturable magnetic core, first and second input windings and first and second bias windings on the core, and a direct current voltage source, with the collector and emitter electrodes of said first transistor connected in series with said first input winding across said source in parallel with the series circuit of the collector and emitter electrodes of said second transistor and said second input winding, and with the first bias winding connected to the base of the first transistor and the second bias winding connected to the base of the second transistor, and with all four windings having the same polarity such that a flux change toward saturation of the core produced by conduction in a transistor also biases the transistor toward conduction, the combination of: first and second charge storage means connected to the base of the first and second transistors respectively; and means including first and second charging windings on said core coupled respectively to said first and second charge storage means for charging each of said charge storage means while the corresponding transistor is conducting and the flux in the core is changing, with the charge on each charge storage means being of a polarity to cut off conduction in the conducting transistor and increase conduction in the other transistor.

2. In a square wave oscillator having first and second transistors, a saturable magnetic core, first and second input windings and first and second bias windings on the core, and a direct current voltage source, with the collector and emitter electrodes of said first transistor connected in series with said first input winding across said source in parallel with the series circuit of the collector and emitter electrodes of said second transistor and said second input winding, and with the first bias winding connected to the base of the first transistor and the second bias winding connected to the base of the second transistor, and with all four windings having the same polarity such that a flux change toward saturation of the core produced by conduction in a transistor also biases the transistor toward conduction, the combination of: first and second charge storage means connected to the base of the first and second transistors respectively; and first and second charging windings on the core and connected across said first and second charge storage means respectively, with said charging windings having the same polarity for charging the corresponding charge storage means to opposite polarities whereby on saturation of the core, the charge storage means connected to the conducting transistor will bias said transistor toward cutoff and the charge storage means connected to the nonconducting transistor will bias said transistor toward conduction.

3. In a square wave oscillator having first and second transistors, a saturable magnetic core, first and second input windings and first and second bias windings on the core, and a direct current voltage source, with the collector and emitter electrodes of said first transistor connected in series with said first input winding across the source and the collector and emitter electrodes of said second transistor connected in series with said second input winding across the source, and with the first bias winding connected to the base of the first transistor and the second bias winding connected to the base of the second transistor, and with all four windings having the same polarity such that a flux change towards saturation of the core produced by conduction in a transistor also biases the transistor toward conduction, the combination of: a first charging winding on said core; a first charging circuit comprising a series resistance and capacitance connected across said first charging winding, with a tap on said resistance connected to the base of the first transistor; a second charging winding on said core; and a second charging circuit comprising a series resistance and capacitance connected across said second charging winding, with a tap on said resistance connected to the base of the second transistor, with said charging windings having the same polarity as said input and bias windings whereby, when the first transistor is conducting and causing flux change in the core, said first capacitance is charged to a polarity which tends to decrease conduction in the first transistor and said second capacitance is charged to a polarity which tends to increase conduction in the second transistor.

4. In a direct current to alternating current converter, the combination of: a direct current source; a saturable core with six serially connected windings thereon; first and second transistors, each having a base and emitter and collector electrodes; means connecting the first winding in series with said source across the collector electrode and emitter electrode of said first transistor; means connecting the second winding in series with said source across the collector electrode and emitter electrode of said second transistor; a first charge storage circuit comprising a capacitance and a resistance connected in series across the fifth winding; a second charge storage circuit comprising a capacitance and a resistance connected in series across the sixth winding; means connecting a point on said first charge storage circuit to said base of said first transistor with resistance only between said base and the junction of the fifth and third windings; means connecting a point on said second charge storage circuit to said base of said second transistor with resistance only between said base and the junction of the fourth and sixth windings; and an output winding on said core.

5. In a direct current to alternating current converter, the combination of: a direct current source; a saturable core with six windings positioned thereon to have the same polarity; first and second transistors, each having a base and emitter and collector electrodes; a first saturating circuit including means connecting a first winding in series with said source across the collector electrode and emitter electrode of said first transistor; a second saturating circuit including means connecting a second winding in series with said source across the collector electrode and emitter electrode of said second transistor; a first charge storage circuit comprising a capacitance and a resistance connected in series across a third winding; a second charge storage circuit comprising a capacitance and a resistance connected in series across a fourth winding; means connecting a point on said first charge storage circuit to said base of said first transistor with resistance only between said base and the junction of the third and fifth windings; means connecting a point on said second charge storage circuit to said base of said second transistor with resistance only between said base and the junction of the fourth and sixth windings with the other end of the fifth winding connected to said first saturating circuit and with the other end of the sixth winding connected to said second saturating circuit; and an output winding on said core.

6. In a direct current to alternating current converter, the combination of: a transformer having a saturable core and a winding thereon; a pair of transistors, each having a base, emitter and collector; a direct current voltage source; means connecting the emitter and collector of one of said transistors with said voltage source to a first pair of voltage taps on said winding and the emitter and collector of the other of said transistors with said voltage source to a second pair of voltage taps on said winding, one of which is common with said first pair of voltage taps, for switching current in said winding said source and said winding for switching current in said winding from said source alternately in opposite directions; a third pair of voltage taps on said winding, with each tap of said third pair connected through a resistor to a base of a transistor respectively; and a fourth pair of voltage taps on said winding, with each tap of said fourth pair connected through a resistance-capacitance network to the base of a transistor respectively, said networks being adapted for changing the bias at the corresponding transistor bases when said core becomes saturated and substantially no voltage is generated between any of the voltage taps of said winding.

7. In a direct current to alternating current converter, the combination of: a transformer having a saturable core; a pair of transistors of the same type; a direct current voltage source connected with one pole to a center tap of said transformer and with another pole in series with the collector and emitter electrodes of one of said transistors to a voltage tap of said transformer displaced from said center tap, means connecting said other pole of said direct current source in series with the collector and emitter electrodes of the other of said transistors to another voltage tap of said transformer displaced from said center tap, said voltage taps being located symmetrically with respect to said center tap; means for connecting the bases of said transistors to bias voltage taps of said transformer located substantially symmetrically with respect to said center tap, whereby said transistors alternately conduct with the voltage developed across said center tap and the tap connected to the base of the conducting transistor of such polarity and magnitude that the conducting transistor is biased for conduction as long as said core is not saturated, and whereby upon saturation of said core the conducting transistor is cut off and the cutoff transistor begins conducting, said transformer including a pair of transition voltage taps corresponding to said bias voltage taps, with the voltage at each transition tap having the same polarity but greater in magnitude than that at the corresponding bias tap; and a resistance-capacitance network connected between each of said transition taps and the base of the corresponding transistor, whereby a short duration pulse is applied to the base of the conducting transistor tending to cut off the transistor when said core becomes saturated and a similar pulse is applied to the base of the nonconducting transistor to cause conduction.

8. In a direct current to alternating current converter, the combination of: a transformer having a saturable core; first and second windings thereon in series connection; first and second transistor switches; a source voltage connected to the junction of said first and second windings and in series with the collector and emitter electrodes of said first transistor switch to the terminal of said first winding remote from said junction; said source voltage also being connected to the junction of said first and second windings and in series with the collector and emitter electrodes of said second transistor switch to the terminal of said second winding remote from said junction; third and fourth windings respectively connected to those terminals of said first and second windings which are remote from said junction; first and second resistors connected to the bases of said first and second transistor switches respectively and the terminals of said third and fourth windings remote from said first and second windings respectively, whereby one transistor is conducting and the other is not conducting as long as the core is not saturated, with the polarity of the voltages induced in the windings of the core such that a conducting condition in one transistor brings about a bias of its base such that it remains conducting until the core is saturated and the coupling bewteen windings is substantially discontinued, whereby the transistor heretofore conducting becomes cut off and the other transistor starts conducting; fifth and sixth windings on said transformer connected to said third and fourth windings at said terminals remote from the center tap; and first and second capacitances connected to the terminals of said fifth and sixth windings remote from the center tap and the bases of said first and second transistors respectively for changing the polarity of the biases on said transistors when said core becomes saturated.

9. In a direct current to alternating current converter, the combination of: a transformer having a saturable core; first and second windings thereon in series connection; first and second transistor switches; a source voltage connected to the junction of said first and second windings and in series with the collector and emitter electrodes of said first transistor switch to the terminal of said first winding remote from said junction; said source voltage also being connected to the junction of said first and second windings and in series with the collector and emitter electrodes of said second transistor switch to the terminal of said second winding remote from said junction; third and fourth windings with one terminal of each connected to said source voltage; first and second resistors connected to the bases of said first and second transistor switches respectively and the terminals of said third and fourth windings remote from said source voltage, whereby one transistor is conducting and the other is not conducting as long as the core is not saturated, with the polarity of the voltages induced in the windings of the core such that a conducting condition in one transistor brings about a bias of its base such that it remains conducting until the core is saturated and the coupling between windings is substantially discontinued, whereby the transistor heretofore conducting becomes cut off and the other transistor starts conducting; fifth and sixth windings on said transformer connected to said third and fourth windings at said terminals remote from said source voltage; and first and second capacitances connected to the terminals of said fifth and sixth windings remote from said third and fourth windings and the bases of said first and second transistors respectively for changing the polarity of the biases on said transistors when said core becomes saturated.

References Cited in the file of this patent

UNITED STATES PATENTS

| | | |
|---|---|---|
| 2,055,208 | Rumpel | Sept. 22, 1936 |
| 2,837,651 | Schultz | June 3, 1958 |
| 2,873,371 | Van Allen | Feb. 10, 1959 |

OTHER REFERENCES

"Portable TV," by Flory et al. in Electronics, Feb. 1, 1957, pages 170–177.

"A High-Speed Two-Winding Transistor-Magnetic-Core Oscillator," by Meyerhoff et al., IRE Transactions on Circuit Theory pages 228–236, September 1957.

UNITED STATES PATENT OFFICE
CERTIFICATE OF CORRECTION

Patent No. 3,051,914                      August 28, 1962

J Herbert Brown

It is hereby certified that error appears in the above numbered patent requiring correction and that the said Letters Patent should read as corrected below.

Column 6, lines 37 and 38, strike out "said source and said winding for switching current in said winding".

Signed and sealed this 22nd day of January 1963.

(SEAL)
Attest:

ERNEST W. SWIDER
Attesting Officer

DAVID L. LADD
Commissioner of Patents